(12) United States Patent
Oi et al.

(10) Patent No.: US 9,551,843 B2
(45) Date of Patent: Jan. 24, 2017

(54) CONNECTOR

(71) Applicants: HONDA TSUSHIN KOGYO CO., LTD., Tokyo (JP); KEIO UNIVERSITY, Tokyo (JP)

(72) Inventors: Shigehiro Oi, Tokyo (JP); Koichiro Yoshimura, Tokyo (JP); Yasuhiro Koike, Kanagawa (JP)

(73) Assignees: HONDA TSUSHIN KOGYO CO., LTD., Tokyo (JP); KEIO UNIVERSITY, Tokyo (JP)

( * ) Notice: Subject to any disclaimer, the term of this patent is extended or adjusted under 35 U.S.C. 154(b) by 0 days.

(21) Appl. No.: 15/082,351

(22) Filed: Mar. 28, 2016

(65) Prior Publication Data

US 2016/0291263 A1 Oct. 6, 2016

(30) Foreign Application Priority Data

Mar. 31, 2015 (JP) .................................. 2015-071636

(51) Int. Cl.
*G02B 6/38* (2006.01)
*H01R 13/58* (2006.01)

(52) U.S. Cl.
CPC ........... *G02B 6/3887* (2013.01); *G02B 6/3809* (2013.01); *H01R 13/5812* (2013.01)

(58) Field of Classification Search
CPC .................................................. G02B 6/3887
See application file for complete search history.

(56) References Cited

U.S. PATENT DOCUMENTS

| 6,227,719 | B1 | 5/2001 | Aoki et al. | |
| 6,325,549 | B1* | 12/2001 | Shevchuk | G02B 6/3809 385/76 |
| 2002/0048434 | A1* | 4/2002 | Asada | G02B 6/3887 385/58 |
| 2003/0007743 | A1* | 1/2003 | Asada | G02B 6/3887 385/81 |
| 2005/0145755 | A1* | 7/2005 | Yuuki | G02B 6/3887 248/49 |
| 2012/0128312 | A1* | 5/2012 | Toda | G02B 6/3806 385/136 |
| 2014/0270664 | A1* | 9/2014 | Isenhour | G02B 6/3628 385/102 |
| 2014/0286611 | A1* | 9/2014 | Pratt | G02B 6/3887 385/78 |
| 2015/0117822 | A1* | 4/2015 | Hu | G02B 6/3858 385/86 |

FOREIGN PATENT DOCUMENTS

| JP | 10-311934 | 11/1998 |
| JP | 2002-228879 | 8/2002 |

* cited by examiner

*Primary Examiner* — Jerry Rahll
(74) *Attorney, Agent, or Firm* — Wenderoth, Lind & Ponack, L.L.P.

(57) ABSTRACT

When a moving member moves to a fixing position, a fixing member moves to a second fixing position, a blade of the fixing member cuts into a protection layer of a cord, and thereby the cord is fixed. When the moving member moves to a releasing position, the fixing member moves to a second releasing position, the blade leaves the protection layer, and thereby the cord is released.

9 Claims, 5 Drawing Sheets

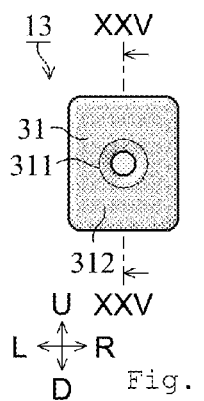
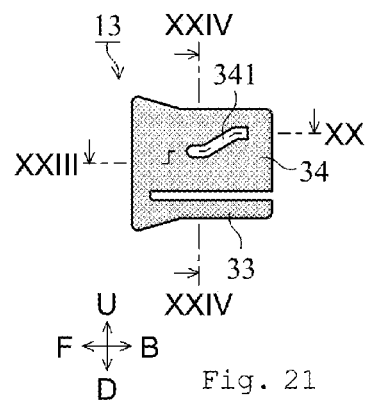
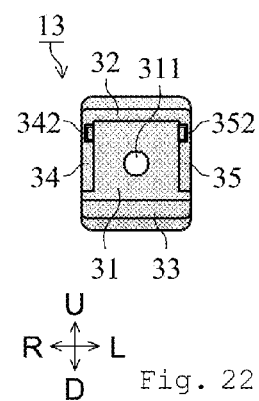
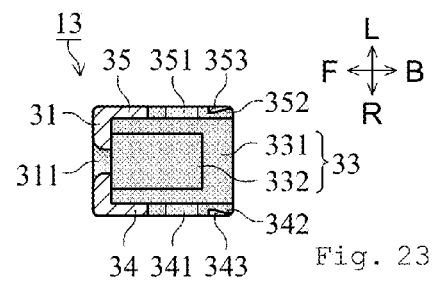
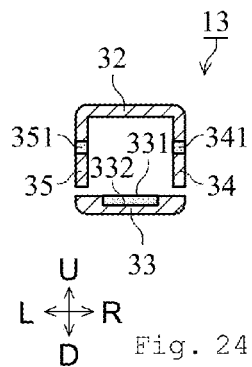
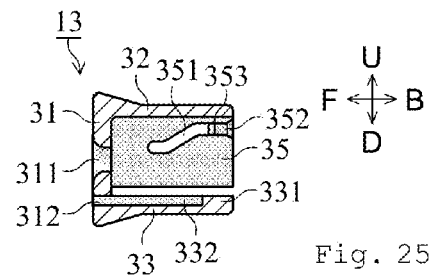

CONNECTOR

Priority is claimed on Japanese Patent Application No. 2015-071636, filed on Mar. 31, 2015, the content of which is incorporated herein by reference.

TECHNICAL FIELD

The present invention relates to a connector for being connected to a cord such as an optical fiber.

BACKGROUND ART

JP2002-228879A discloses an optical connector for fixing an optical fiber by pressing a distal end of the optical fiber into an inserting part.

JP10-311934A discloses an optical connector for fixing an optical fiber by piercing a cuneate projection into a coating of the optical fiber.

SUMMARY OF INVENTION

Technical Problem

The former has a weak holding power. A force about 10 to 20N (Newtons) may make the optical fiber pulled out.

The latter has a stronger holding power than the former. However, it is hard to remove the optical fiber even when required, because the cuneate projection is pierced into the coating.

The present invention aims to securely hold a cord such as an optical fiber while the cord can easily be removed when required.

Solution to Problem

A connector according to the present invention is connected with a cord having a transmission part to transmit signals and a protection layer covering the transmission part. The connector includes: a body; a moving member, configured to be movable, relatively to the body, between a releasing position and a fixing position in a first direction from the releasing position; and a fixing member, configured to be movable, relatively to the body, between a second releasing position and a second fixing position in a second direction from the second releasing position, the second direction being different from the first direction. The fixing member has a blade configured to cut into the protection layer. Movement of the moving member causes movement of the fixing member. When the moving member moves to the fixing position, the fixing member moves to the second fixing position, the blade cuts into the protection layer, and thereby the cord is fixed. When the moving member moves to the releasing position, the fixing member moves to the second releasing position, the blade leaves the protection layer, and thereby the cord is released.

The moving member may have a guide groove extending along a third direction different from the first direction and the second direction. The fixing member may have a guide projection engaging with the guide groove.

The body may have a second guide groove extending along the second direction. The guide projection may engage with the guide groove and the second guide groove.

The moving member may have: a introducing groove, connected to the guide groove, and extending along the first direction, the guide projection passing through the introducing groove when the connector is assembled; and a preventing part, configured to prevent the guide projection from passing through the introducing groove toward an opposite direction.

The moving member may have an engaging part. The body may have a second engaging part configured to contact with the engaging part so as to prevent the moving member from easily moving.

The body may have a third engaging part configured to contact with the engaging part so as to prevent the moving member from moving beyond the releasing position.

The moving member may have a penetrating hole penetrating the moving member toward the first direction, the cord being inserted through the penetrating hole.

The body may have: an inserting hole, configured to insert the cord into the inserting hole along the first direction; and a supporting part, configured to support the cord, inserted in the inserting hole, from the second direction so as to aid the blade to cut into the protection layer.

The cord may be an optical fiber.

Advantageous Effects of Invention

The connector according to the present invention enables to securely hold the cord by moving the moving member to the fixing position. Also, it enables to easily remove the cord by moving the moving member to the releasing position.

Engagement of the guide projection with the guide groove enables to convert movement of the moving member along the first direction to movement of the fixing member along the second direction.

Engagement of the guide projection with both of the guide groove and the second guide groove enables to make guide mechanisms smaller.

The introducing groove enables to make assembling the connector easier. The preventing part prevents the connector from being broken up.

The engaging part and the second engaging part enable to prevent unintentional movement of the moving member.

The engaging part and the third engaging part enable to prevent the connector from being broken up.

The structure where the cord is inserted through the penetrating hole of the moving member enables to make the connector smaller.

The supporting part enables to make the blade securely cut into the protection layer.

BRIEF DESCRIPTION OF DRAWINGS

FIGS. 20 to 25 are a front view, a side view, a back view, a XXIII-XXIII section view, a XXIV-XXIV section view and a XXV-XXV section view of a moving member, respectively;

DESCRIPTION OF EMBODIMENTS

A connector 10, shown in FIGS. 1 to 4, is configured to be connected with a cord. The term "cord" implies a cable or the like.

The cord has the followings.

A transmission part. It is a plastic optical fiber (POF), a copper wire or the like, and transmits signals such as optical signals or electric signals.

A protection layer. It is a coating, an outside covering, or the like. It covers and protects the transmission part.

The connector 10 includes the followings.

A body 12. It has a base 22 and a cover 21.

Figure 1:
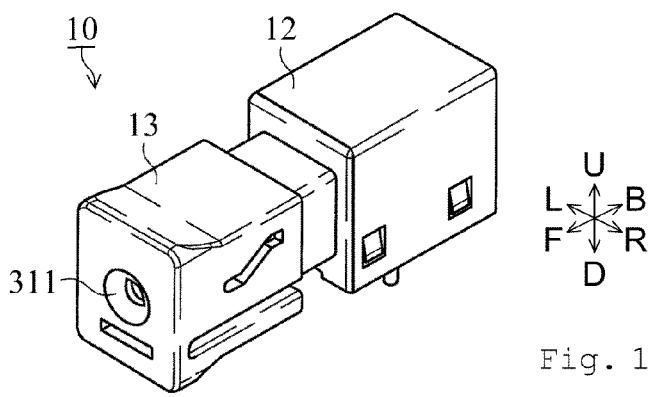
FIGS. 1 to 4 are a perspective view, a front view, a side view and a exploded view of a connector, respectively.
Figure 2:
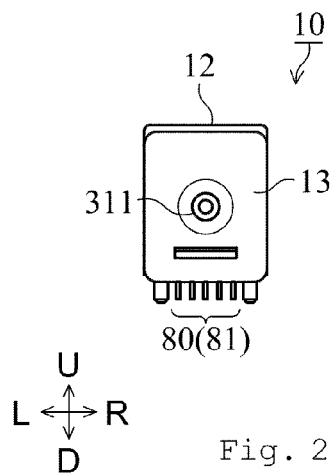
Figure 3:
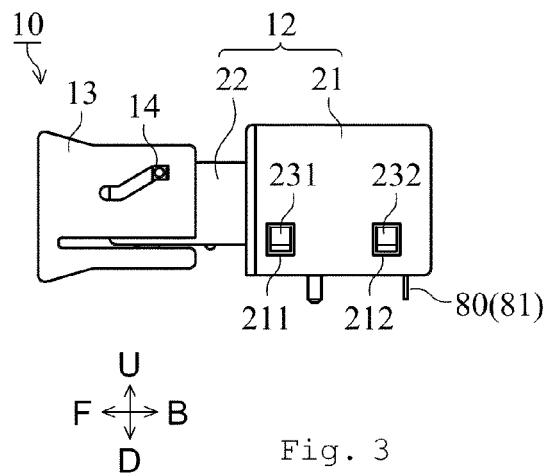
Figure 4:
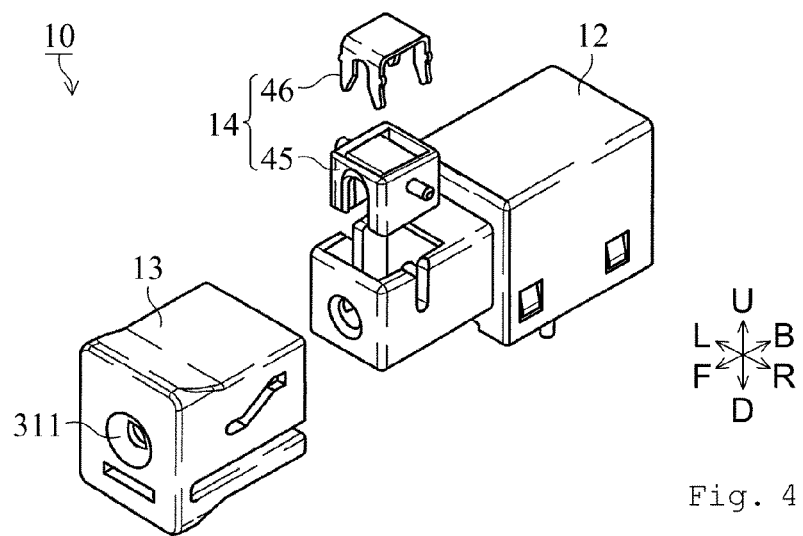
Figure 5:
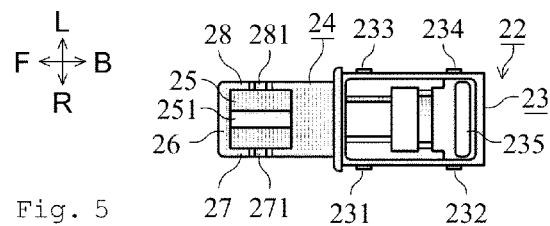
FIGS. 5 to 11 are a plan view, a front view, a side view, a bottom view, a IX-IX section view, a X-X section view and a XI-XI section view of a body, respectively.
Figure 6:
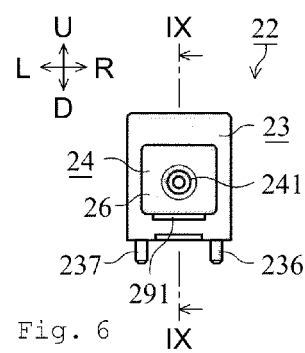
Figure 7:
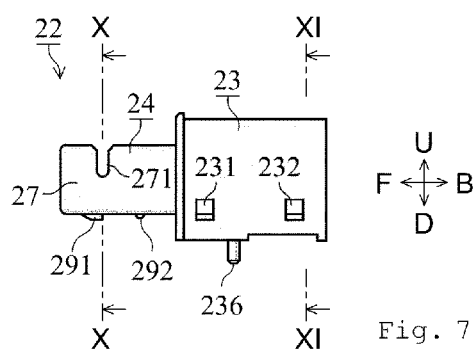
Figure 8:
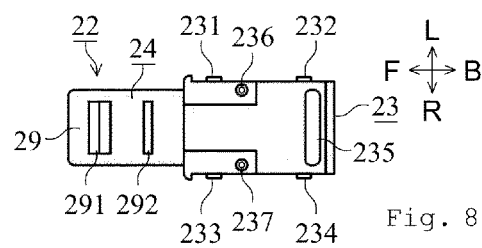
Figure 9:
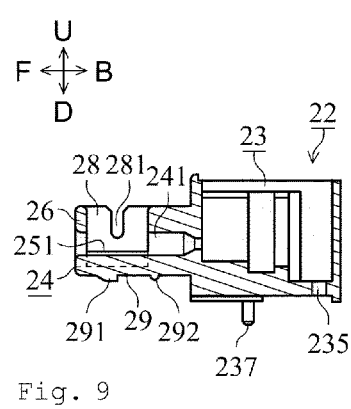
Figure 10:
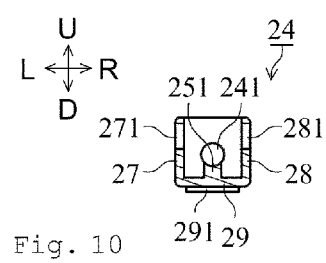
Figure 11:
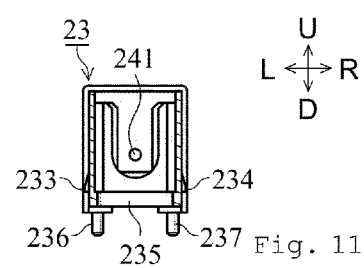

The base 22 is made of plastics, and accommodates a circuit 80 such as an optical/electric conversion circuit. The circuit 80 has, e.g., terminals 81 exposed out of the base 22. The cover 21 is a metal shield, covers the circuit 80 accommodated in the base 22, and has locking holes 211 to 214. The locking holes 213 and 214, not shown, are arranged at L side of the cover 21, symmetrically to the locking holes 211 and 212 arranged at R side of the cover 21. The locking holes 211 to 214 are engaged with a locking projections 231 to 234 of the base 22 to fix the cover 21 to the base 22. The locking projections 233 and 234 are shown in FIG. 5.

A moving member 13. It is made of plastics, and engages with the body 12 to be movable relatively to the body 12 along F-B direction. It has a penetrating hole 311. An distal end of the cord is inserted into the penetrating hole 311 from F direction.

A fixing member 14. It is accommodated in the body 12 to be movable, relatively to the body 12, along U-D direction. It fixes the cord inserted through the penetrating hole 311, and has a movable piece 45 made of plastics and a intruding piece 46 fixed to the movable piece 45.

As shown in FIGS. 5 to 11, the base 22 of the body 12 has the followings.

An accommodating part 23. It has a hollow box shape opened toward U direction. The circuit 80 is stored through an opening at U side into the accommodating part 23, then the opening at U side is closed with the cover 21.

A protrusion 24. It has a roughly quadrangular prism shape, and is protruded toward F direction from a wall at F side of the accommodating part 23.

The accommodating part 23 has the followings.

Locking projections 231 and 232. They protrude from a wall at R side of the accommodating part 23 toward R direction. They engage with the locking holes 211 and 212 of the cover 21 to lock the cover 21.

Locking projections 233 and 234. They protrude from a wall at L side of the accommodating part 23 toward L direction. They engage with the locking holes 213 and 214 of the cover 21 to lock the cover 21.

An opening 235. It penetrates a wall at D side of the accommodating part 23. The terminals 81 of the circuit 80 is exposed through the opening 235.

Legs 236 and 237. They protrude from the wall at D side of the accommodating part 23 toward D direction. They are used for positioning the connector 10 to a circuit board or the like.

The protrusion 24 has the followings.

An inserting hole 241. It penetrates the protrusion 24 along F-B direction. The distal end of the cord is inserted into the inserting hole 241, and is optically or electrically connected with the circuit 80 accommodated in the accommodating part 23.

A recess 25. It is provided from U side of the protrusion 24 toward D direction, and reaches lower than the inserting hole 241. It accommodates the fixing member 14. It has a supporting part 251 inside. The supporting part 251 has a U side face concave so as to be seamlessly connected with the inner face of the inserting hole 241, and supports the cord inserted in the inserting hole 241 from D direction.

A front wall 26. It adjoins the recess 25 in F direction, and penetrated by the inserting hole 241.

A side wall 27. It adjoins the recess 25 in R direction, and has a guide groove 271 extending from a U side edge toward D direction. The guide groove 271 penetrates the side wall 27 in L-R direction.

A side wall 28. It adjoins the recess 25 in L direction, and has a guide groove 281 extending from a U side edge toward D direction. The guide groove 281 penetrates the side wall 28 in L-R direction.

A bottom wall 29. It adjoins the recess 25 in D direction, and has engaging parts 291 and 292 outside. The engaging parts 291 has a slope in F side. The engaging parts 292 has a semicylindrical shape. The supporting part 251 protrudes from the bottom wall 29 toward U direction.

Figure 12:
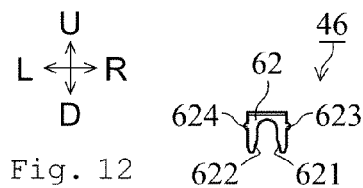
FIGS. 12 and 13 are a front view and a side view of a intruding piece, respectively.
Figure 13:
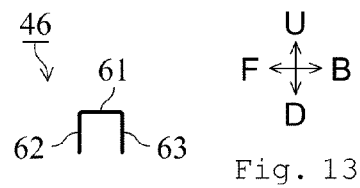
Figure 14:
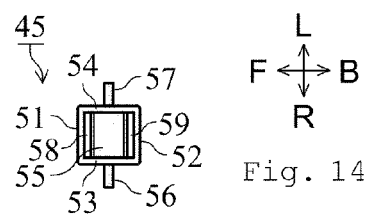
FIGS. 14 to 19 are a plan view, a front view, a side view, a bottom view, a XVIII-XVIII section view and a XIX-XIX section view of a movable piece, respectively.
Figure 15:
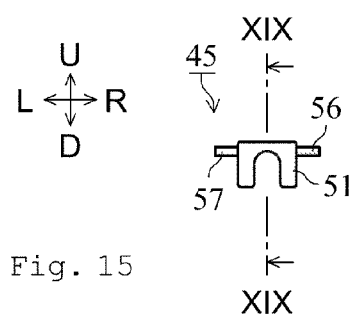
Figure 16:
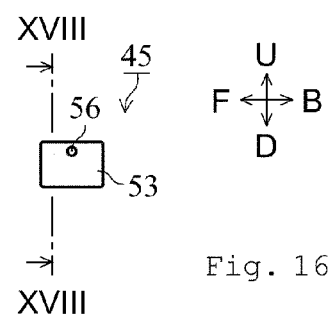
Figure 17:
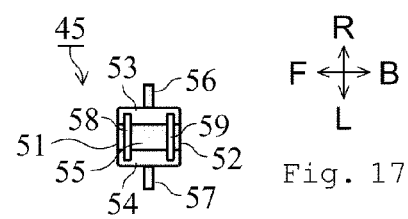
Figure 18:
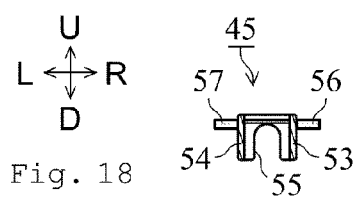
Figure 19:
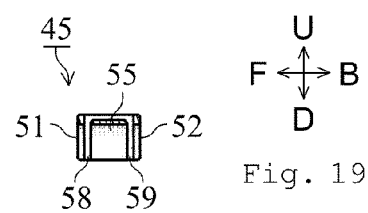

As shown in FIGS. 12 and 13, the intruding piece 46 of the fixing member 14 is formed by bending a metal plate, and has the followings.

A central part 61. It is roughly perpendicular to U-D direction, and has a roughly rectangular shape.

An end part 62. It extends from an edge at F side of the central part 61 toward D direction, and has blades 621 and 622, and claws 623 and 624. The blades 621 and 622 cut into the protection layer of the cord inserted in the inserting hole 241 of the base 22, so as to fix the cord. The claw 623 protrudes from an edge at R side of the end part 62 toward R direction. The claw 624 protrudes from an edge at L side of the end part 62 toward L direction.

An end part 63. It extends from an edge at B side of the central part 61 toward D direction. It is symmetric to the end part 62, and has blades and claws, which are not shown, in the same manner as the end part 62.

As shown in FIGS. 14 to 19, the movable piece 45 of the fixing member 14 has the followings.

A front wall 51. It is a plane plate roughly perpendicular to F-B direction, and has a cut for stretching over the cord inserted into the inserting hole 241, at D side.

A rear wall 52. It is a plane plate roughly parallel to the front wall 51. It has a cut for stretching over the cord, at D side in the same manner as the front wall 51.

A side wall 53. It is a plane plate roughly perpendicular to L-R direction, and is connected with edges at R side of the front wall 51 and the rear wall 52.

A side wall 54. It is a plane plate roughly parallel to the side wall 53, and is connected with edges at L side of the front wall 51 and the rear wall 52.

A pressing part 55. It is connected with the side walls 53 and 54. It has a cut for stretching over the cord, at D side. It is not connected with the front wall 51 or the rear wall 52. Gaps 58 and 59 are provided between it and the front wall 51 and the rear wall 52.

A guide projection 56. It has a roughly cylindrical shape, and extends from R side of the side wall 53 toward R direction.

A guide projection 57. It has a roughly cylindrical shape, and extends from L side of the side wall 54 toward L direction.

When the connector 10 is assembled, the intruding piece 46 is firstly combined with the movable piece 45 to form the fixing member 14. Inserting of the intruding piece 46 from U direction into the movable piece 45 causes the end parts 62 and 63 to enter into the gaps 58 and 59. The blades are exposed in the cuts of the front wall 51, the rear wall 52 and the pressing part 55. And the claws contact with the side wall 53 and 54 to prevent the intruding piece 46 from being removed from the movable piece 45.

Next, The fixing member 14 is combined with the body 12. By inserting of the fixing member 14 from U direction into the recess 25, the front wall 51, the rear wall 52, and the side walls 53 and 54 adjoins inner faces of the recess 25, and the guide projections 56 and 57 engages with the guide grooves 271 and 281. This enables the fixing member 14 to move along U-D direction relatively to the body 12.

A span between distal ends of the guide projections 56 and 57 is greater than a width in L-R direction of the protrusion 24, but less than a width in L-R direction of the moving member 13. So, the distal ends of the guide projections 56 and 57 stick out from the guide grooves 271 and 281 and engage with the moving member 13, but do not stick out of the moving member 13.

As shown in FIGS. 20 to 25, the moving member 13 has the followings.

A front wall 31. It is a plane plate roughly perpendicular to F-B direction, and has a unlocking hole 312. It is penetrated by the penetrating hole 311 and the unlocking hole 312 along F-B direction. The unlocking hole 312 is used for removing the moving member 13 from the body 12.

A top wall 32. It extends from an edge at U side of the front wall 31 toward B direction. It is thicker at F side than at B side, in order to make it easier to grab the moving member 13 with fingers. It contacts with and slides on a face at U side of the protrusion 24.

An engaging part 33. It extends from an edge at D side of the front wall 31 toward B direction. It is thicker at F side than at B side, in order to make it easier to grab the moving member 13 with fingers. It contacts with and slides on the bottom wall 29 of the protrusion 24, and engages with the engaging part 291 and 292 of the bottom wall 29.

A side wall 34. It extends from an edge at R side of the front wall 31 toward B direction. It is connected to the top wall 32, but not to the engaging part 33. It contacts with and slide on the side wall 27 of the protrusion 24.

A side wall 35. It extends from an edge at L side of the front wall 31 toward B direction. It is connected to the top wall 32, but not to the engaging part 33. It contacts with and slide on the side wall 27 of the protrusion 24.

The engaging part 33 has the followings.

An engaging projection 331. It is provided from an edge at B side toward U direction.

An engaging recess 332. It adjoins the engaging projection 331 in F direction, and is connected to the unlocking hole 312.

The side wall 34 has the followings.

A guide groove 341. It penetrates the side wall 34 in L-R direction. It mainly extends along an oblique direction different from both of F-B direction and U-D direction. It has parts extending along F-B direction at both ends. It engages with the guide projection 56.

An introducing groove 342. It provided on a face at L side of the side wall 34. It is connected to an end at B side of the guide groove 341. It extends along F-B direction, and reaches an edge at B side of the side wall 34.

A preventing part 343. It is located in the introducing groove 342. It adjoins the guide groove 341 at F side. It has a slope at B side. It makes the introducing groove 342 shallower in F side than in B side.

The side wall 35 is symmetrical to the side wall 34, and has a guide groove 351, an introducing groove 352 and a preventing part 353. They corresponds to the guide groove 341, the introducing groove 342 and the preventing part 343, respectively.

The guide groove 351 engages with the guide projection 57.

The span between the distal ends of the guide projections 56 and 57 is less than a distance between bottoms of the introducing grooves 342 and 352, and is slightly greater than a distance between tops of the preventing parts 343 and 353.

The top wall 32, the engaging part 33, and the side walls 34 and 35 surround and slide on the protrusion 24. This makes the moving member 13 movable along F-B direction relatively to the body 12.

When the connector 10 is assembled, the moving member 13 approaches the protrusion 24 from F direction. This causes the engaging part 33 to contact with the engaging part 291. The engaging part 291 has the slope in F side, and the engaging part 33 is not connected with the side walls 34 and 35. This enables the engaging part 33 to be easily deformed and bended toward D direction, so that the engaging projection 331 overtakes the engaging part 291.

Concurrently, the guide projections 56 and 57 pass through the introducing groove 342 and 352. The guide projections 56 and 57 contact with the preventing parts 343 and 353. The slopes at B side of the preventing parts 343 and 353 make the side wall 34 and 35 to be deformed and expanded toward L-R direction, and thereby enable the guide projections 56 and 57 to pass over the preventing part 343 and 353. This enables the guide projections 56 and 57 to reach and to engage with the guide grooves 341 and 351.

Once the engaging projection 331 reaches B side of the engaging part 291, it is hard that the engaging projection 331 overtakes the engaging part 291 toward F direction. The reason is that the engaging part 291 has no slope in B side, and thereby the engaging part 33 is not easily deformed. This prevents the moving member 13 from being removed.

If you want to remove the moving member 13, you can deform the engaging part 33 by pushing down the engaging part 33 with a slender tool or the like inserted through the unlocking hole 312.

Further movement of the moving member 13 toward B direction causes the engaging part 33 to contact with the engaging part 292. Since the engaging part 292 has the semicylindrical shape, a bit stronger pushing of the moving member 13 is required in order that the engaging projection 331 overtakes the engaging part 292.

In the same manner, a bit stronger pulling of the moving member 13 is required in order that the engaging projection 331 overtakes the engaging part 292 toward F direction.

This achieves prevention of unintentional movement of the moving member 13 and facility of required movement of the moving member 13.

(Process for Connecting Connector to Cord)

Figure 26:
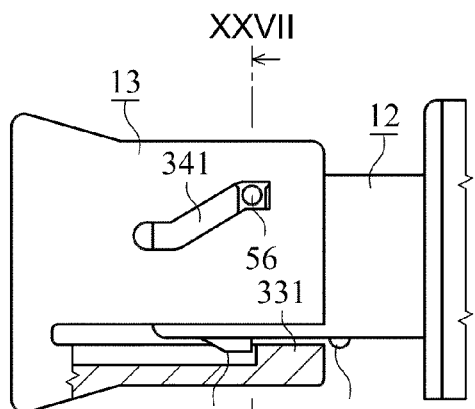
FIGS. 26 and 27 are a partially broken side view and a XVII-XVII section view of the connector in a releasing state, respectively.
Figure 27:
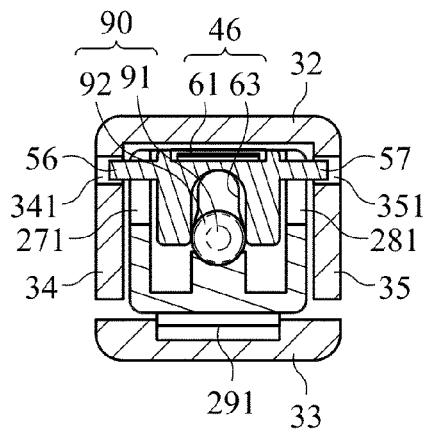

Firstly, the connector 10 is made into a releasing state, shown in FIGS. 26 and 27. In other words, the engaging projection 331 is located at F side of the engaging part 292 by pulling the moving member 13 toward F direction. Since engaging with both of the guide grooves 271 and 341, the guide projection 56 is guided to a place where the guide grooves 281 and 351 are overlapped. In the same manner, the guide projection 57 is guided to a place where the guide grooves 281 and 351 are overlapped. This forces to raise the fixing member 14 toward U direction.

Next, the cord 90 is inserted into the penetrating hole 311, to contact a distal end of the cord 90 with a bottom of the inserting hole 241.

Figure 28:
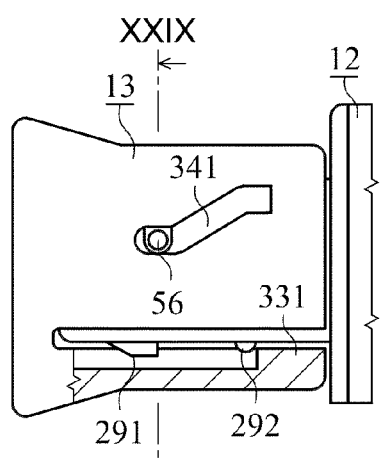
FIGS. 28 and 29 are a partially broken side view and a XXIX-XXIX section view of the connector in a fixing state, respectively.
Figure 29:
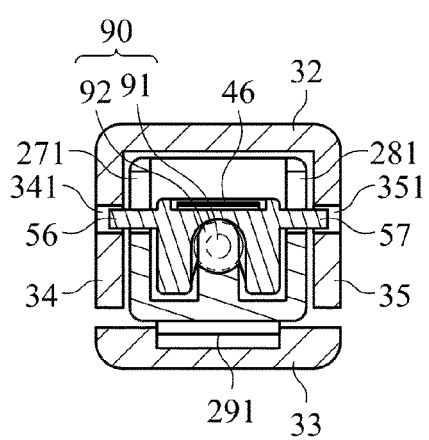

Then, the connector 10 is made into a fixing state, shown in FIGS. 28 and 29. In other words, the engaging projection 331 is located at B side of the engaging part 292 by pushing the moving member 13 toward B direction. The guide grooves 341 and 351 guide the guide projections 56 and 57, and thereby the fixing member 14 is forcedly moved toward D direction. This causes the blades of the intruding piece 46 to cut into the protection layer 92 of the cord 90, and thereby the cord 90 is fixed.

The cord 90 is securely held with strong holding power, e.g., greater than 50N, since the blades is cutting in the protection layer 92.

The front wall 51, the rear wall 52 and the pressing part 55 of the fixing member 14 stretch over and press the cord 90 from U direction to the supporting part 251. This enables to prevent mislocation of the cord 90.

Setting a distance between the two blades, belonging to the same end part, greater than a diameter of the transmission part 91 enables to prevent the blades from hurting the transmission part 91. This enables a transmission capacity of the cord 90 to be kept.

(Process for Disconnecting Connector from Cord)

First, the connector 10 is returned into the releasing state shown in FIGS. 26 and 27. The guide grooves 341 and 351 guide the guide projections 56 and 57, and thereby the fixing member 14 is moved toward U direction. This causes the blades of the intruding piece 46 to leave the protection layer 92 of the cord 90, and thereby the cord 90 is released.

Then, the cord 90 is pulled out. It is easy to extract the cord 90 since the blades are apart from the protection layer 92.

In this manner, the cord 90 is securely held by moving the moving member 13 to a fixing position, and the cord 90 is easily removed by moving the moving member 13 to a releasing position.

The above described embodiment is an example to make understanding easier. The present invention is not limited to the example, and includes any modified, altered, added, or removed variations, without departing from the scope of the claims attached herewith. This can be easily understood by persons skilled in the art.

For example, the connector is not limited to accommodate a circuit. It may be a plug configured to engage with a receptacle connected with a circuit, another cord or the like. It may be a receptacle configured to engage with a plug connected with a circuit, another cord or the like.

Main material of the connector is not limited to plastics. It may be other materials such as metals.

Material of the intruding piece is not limited to metals. It may be other materials such as plastics.

The fixing member is not limited to be formed by combining the movable piece and the intruding piece. It may be integrally formed.

Each of the component is not limited to be integrally formed. It may be formed by combining a plural of independent items.

REFERENCE SIGNS LIST

10: connector; 12: body; 13: moving member; 14: fixing member; 21: cover; 211 to 214: locking hole; 22: base; 23: accommodating part; 231 to 234: locking projection; 235: opening; 236 and 237: leg; 24: protrusion; 241: inserting hole; 25: recess; 251: supporting part; 26, 31 and 51: front wall; 27, 28, 34, 35, 53 and 54: side wall; 271, 281, 341 and 351: guide groove; 29: bottom wall; 291, 292 and 33: engaging part; 311: penetrating hole; 312: unlocking hole; 32: top wall; 331: engaging projection; 332: engaging recess; 342 and 352: introducing groove; 343 and 353: preventing part; 45: movable piece; 46: intruding piece; 52: rear wall; 55: pressing part; 56 and 57: guide projection; 58 and 59: gap; 61: central part; 62 and 63: end part; 621 and 622: blade; 623 and 624: claw; 80: circuit; 81: terminal; 90: cord; 91: transmission part; and 92: protection layer.

The invention claimed is:

1. A connector for being connected with a cord having a transmission part to transmit signals and a protection layer covering the transmission part, the connector comprising:
   a body;
   a moving member, configured to be movable, relatively to the body, between a releasing position and a fixing position in a first direction from the releasing position; and
   a fixing member, configured to be movable, relatively to the body, between a second releasing position and a second fixing position in a second direction from the second releasing position,
   the second direction being different from the first direction, wherein
   the fixing member has a blade configured to cut into the protection layer,
   movement of the moving member causes movement of the fixing member,
   when the moving member moves to the fixing position, the fixing member moves to the second fixing position, the blade cuts into the protection layer, and thereby the cord is fixed, and
   when the moving member moves to the releasing position, the fixing member moves to the second releasing position, the blade leaves the protection layer, and thereby the cord is released.

2. The connector of claim 1, wherein
   the moving member has a guide groove extending along a third direction different from the first direction and the second direction, and
   the fixing member has a guide projection engaging with the guide groove.

3. The connector of claim 2, wherein
   the body has a second guide groove extending along the second direction, and
   the guide projection engages with the guide groove and the second guide groove.

4. The connector of claim 2, wherein
   the moving member has:
      a introducing groove, connected to the guide groove, and extending along the first direction, the guide projection passing through the introducing groove when the connector is assembled; and
      a preventing part, configured to prevent the guide projection from passing through the introducing groove toward an opposite direction.

5. The connector of claim 1, wherein
   the moving member has a engaging part, and
   the body has a second engaging part configured to contact with the engaging part so as to prevent the moving member from easily moving.

6. The connector of claim 5, wherein
   the moving member has an engaging part, and
   the body has a third engaging part configured to contact with the engaging part so as to prevent the moving member from moving beyond the releasing position.

7. The connector of claim 1, wherein
the moving member has a penetrating hole penetrating the moving member toward the first direction, the cord being inserted through the penetrating hole.

8. The connector of claim 1, wherein
the body has:
- an inserting hole, configured to insert the cord into the inserting hole along the first direction; and
- a supporting part, configured to support the cord, inserted in the inserting hole, from the second direction so as to aid the blade to cut into the protection layer.

9. The connector of claim 1, wherein
the cord is an optical fiber.

* * * * *